E. J. SMITH.
LOCKING DEVICE FOR AUTOMOBILE STEERING KNUCKLE ARMS.
APPLICATION FILED AUG. 7, 1918.

1,333,878. Patented Mar. 16, 1920.

WITNESSES
D. McMillan
L. A. Larsen

INVENTOR
ELMER J. SMITH
BY O. M. Vrooman
ATTORNEY

UNITED STATES PATENT OFFICE.

ELMER J. SMITH, OF SAN JOSE, CALIFORNIA.

LOCKING DEVICE FOR AUTOMOBILE-STEERING-KNUCKLE ARMS.

1,333,878.

Specification of Letters Patent.   Patented Mar. 16, 1920.

Application filed August 7, 1918. Serial No. 248,707.

*To all whom it may concern:*

Be it known that I, ELMER J. SMITH, a citizen of the United States, residing at San Jose, in the county of Santa Clara and State of California, have invented a new and useful Improvement in Locking Devices for Automobile-Steering-Knuckle Arms, of which the following is a specification.

My invention relates to improvement in devices for locking automobiles that may be attached to the front axle in such a manner that the steering knuckle arm may be locked in a set position thereby preventing the steering of the automobile and the objects of my invention are:

First: To provide a locking device for automobile steering knuckle arms that can be locked by means of any padlock of a suitable size.

Second: To provide a locking device for automobile steering knuckle arms that may be made in sizes adaptable to any automobile.

A further object is to generally improve this class of automobile locks so as to increase their usefulness, durability and efficiency.

With these and other objects in view my invention consists in the novel features of construction and arrangement of parts to be more fully pointed out and claimed.

For a more detailed description of my invention and the merits thereof reference is to be had to the accompanying drawings forming a part of this specification, it being understood that various changes in form, proportion and minor details of construction may be resorted to within the scope of the appended claim.

In the drawings similar reference characters indicate corresponding parts in all the views.

Figure 1:
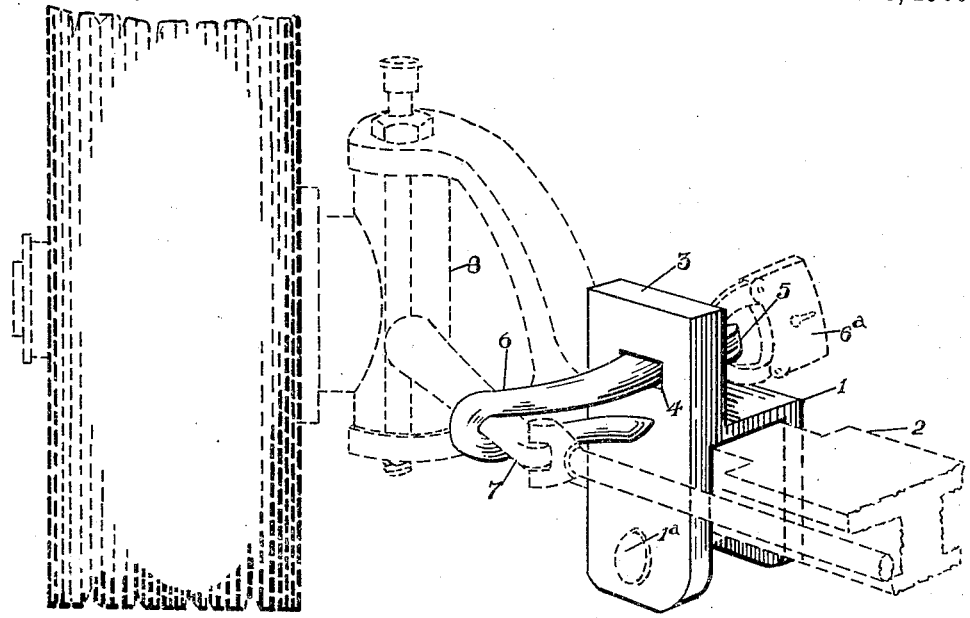
Figure 1 is a perspective view of part of the axle and steering knuckle of an automobile showing my locking device in place engaging the steering knuckle arm.
Figure 3:
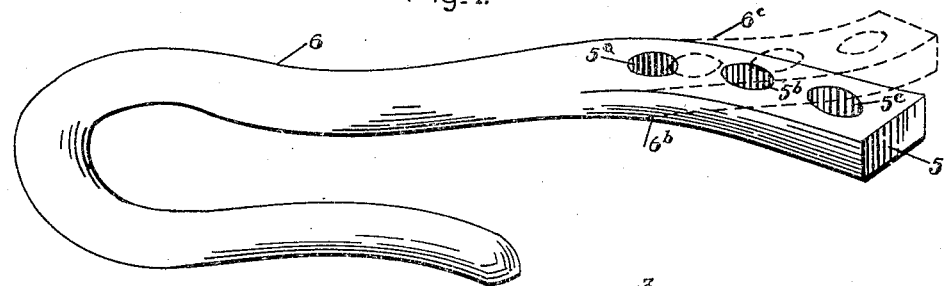
Fig. 3 is a perspective view of the engaging and locking hook showing the hook in full lines, adapted to engage the right hand steering knuckle arm and showing the necessary bend in dotted lines to adapt it to engage the left hand steering knuckle arm.
Figure 2:
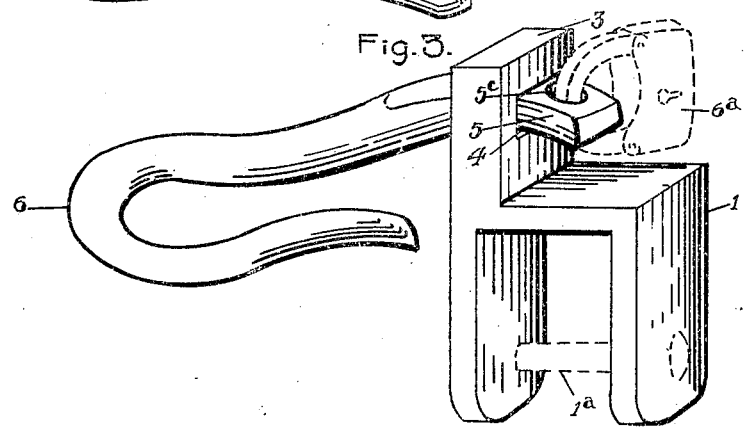
Fig. 2 is a perspective view of my locking device, detached.

My improved locking device for automobile steering knuckle arms, forming the subject matter of the present invention, consists of a U shaped metal clamp, portion 1 of a size suitable to be fastened permanently to the front axle 2 of an automobile by means of rivet 1ª; an extension or projecting ear is shown at 3 integral therewith and having an opening 4 therethrough, adapted to receive the perforated end portion 5 of the locking hook, member 6. The perforated end portion 5 has a plurality of openings or perforations 5ª—5ᵇ—5ᶜ anyone of which is adapted to receive an ordinary padlock of a suitable size, as shown in dotted lines at 6ª. The hook portion is adapted to hook over the steering knuckle arm 7 of steering knuckle 8. The perforated end portion 5 being bent slightly, as shown at 6ᵇ, permits the end portion 5 to pass through the opening 4 of the clamp 1 while the hook portion is hooked over the steering knuckle arm 7. The end portion 5 may be bent in either direction as shown in dotted lines at 6ᶜ adapted to permit locking the steering knuckle arm of other front steering knuckles, than the one shown, requiring the opposite angle.

The operation of my locking device for automobile steering knuckle arms is as follows:

The clamp portion 1 is firmly riveted to the front axle of an automobile in such a manner that, when the steering knuckle is brought into a cramped position, the locking hook member 6 may be hooked over the steering knuckle arm 7 and the perforated end portion 5 passed through the opening 4 in the projecting ear 3 as far as it will go. A suitable padlock is then locked through the desired perforation, thus locking the steering knuckle arm in a set cramped position.

Having thus described my invention what I claim as new and desire to secure by Letters Patent is:

A locking device for automobile steering knuckle arms comprising in combination with a U shaped metal clamp adapted to be securely fastened to the axle of an automobile, adjacent the steering knuckle, said clamp having a lug or ear projecting a distance beyond the base of the clamp parallel with the sides thereof and integral therewith, said lug or ear being provided with an opening therethrough; of a hook shaped metal locking member one end of which is perforated and slightly bent in a plane opposite to that of the hook, said end being adapted to pass through the opening in the lug or ear of the clamp whereby a suitable padlock may be locked through said perforated end portion and lock said hook shaped locking member in engagement with said lug or ear substantially as set forth.

In testimony whereof I affix my signature in the presence of two subscribing witnesses.

ELMER J. SMITH.

Witnesses:
S. S. CULVER,
D. McMILLAN.